United States Patent [19]

Machmerth

[11] 4,439,011
[45] Mar. 27, 1984

[54] APPARATUS FOR FOCUSING AN OPTICAL SYSTEM

[75] Inventor: Herbert Machmerth, Solms, Fed. Rep. of Germany

[73] Assignee: Ernst Leitz Wetzlar GmbH, Wetzlar, Fed. Rep. of Germany

[21] Appl. No.: 328,535

[22] Filed: Dec. 8, 1981

[30] Foreign Application Priority Data

Dec. 24, 1980 [DE] Fed. Rep. of Germany ....... 3049138

[51] Int. Cl.³ .......................... G02B 7/04; F16H 53/08
[52] U.S. Cl. ........................................ 350/255; 74/569
[58] Field of Search ......................... 350/255, 429–430; 354/195; 74/569

[56] References Cited

U.S. PATENT DOCUMENTS

| 676,044 | 6/1901 | Locke | 74/569 |
| 1,985,901 | 1/1935 | Liles | 74/569 |
| 3,677,155 | 7/1972 | Bechmann | |

*Primary Examiner*—William H. Punter
*Attorney, Agent, or Firm*—Wells & Wells

[57] ABSTRACT

A device for focusing an optical system which consists essentially of a guide cylinder and a coaxial tube guided inside or onto the cylinder and containing at least a portion of an optical system. The guide cylinder and the tube are relatively displaced by a rotational motion converted into a linear motion for the purpose of focusing.

The relative displacement between the guide cylinder and tube components (1,2) of the device are produced according to principles practised with ball thread spindles. For complying thereto each component is provided with a guide groove (3,4) helically winding around the axis of rotation (5) of each component (1,2). One of the components (1,2) is provided with a return channel (6) connecting at least two consecutive turns of the guide groove (3). The segment of the guide groove (3,4) bounded by the two junctions (7,8) of the return channel (6) and the return channel (6) are filled with balls (9) having such a thickness that the two components (1,2) which must be displaced with respect to each other are interconnected only by means of the balls (9).

7 Claims, 3 Drawing Figures

APPARATUS FOR FOCUSING AN OPTICAL SYSTEM

CROSS-REFERENCE TO A RELATED APPLICATION

Applicant claims priority under 35 USC 119 for application P 30 49138.4 filed Dec. 24, 1980 in the Patent Office of the Federal Republic of Germany.

BACKGROUND OF THE INVENTION

The field of the invention is lens mounts for optics having axial adjustment. The present invention is particularly concerned with an apparatus for focusing an optics and consists essentially of a guide cylinder and of a tube guided therein or thereon and containing at least a portion of the optics, and in this device the cylinder and the tube are mutually displaced by means of a rotational motion converted into a linear motion for the purpose of focusing the optics.

Such a prior art lens mount is disclosed in U.S. Pat. No. 3,677,155, the disclosure of which is incorporated therein.

U.S. Pat. No. 3,677,155 discloses, among other things, a lens mount for a photographic objective having an optical axis, a stationary tubular mount adapted to be attached to a camera body, a range adjustment ring rotatably supported on the mount member, a lens barrel arranged coaxially inside the stationary mount member and means for mechanically interconnecting the range adjustment ring and the lens barrel* in the direction of the optical axis upon rotation of the range adjustment ring.

*for displacing said lens barrel

According to the prior art the optics are mounted in a system which is referred to as a "helical lens mount" wherein the guide cylinder and a coaxial tube are operationally connected by Acme or V threads having several turns and have corresponding pitches and are moved with respect to each other by hand or by a motor.

Such a prior art apparatus suffers from the drawback that its high sliding friction between the guide cylinder and the tube requires energy output to overcome the friction by hand or by motor. In particular where focusing is by means of a motor, this focusing requires bigger motors and high capacity energy sources. In photographic cameras for instance, there results the need for relatively large, cumbersome energy source containers.

SUMMARY OF THE INVENTION

Having in mind the limitations of the prior art it is an object of the present invention to provide an apparatus for focusing optical systems which in spite of easy motion permits reliable, largely play free operation with only a slight "stick-slip" effect in all positions, and which can easily be controlled as regards its being set into motion and being stopped. For an optics focusing apparatus and as practised at ball thread spindles this object is achieved by a guide groove being provided for each of the two components of the apparatus which are to be displaced with respect to each other and winding its way helically about the component's axis of rotation, by a return channel in one of the components connecting at least two consecutive turns of the guide groove, and by balls being filled into the guide groove segment bounded by the two junction sites of the return channel as well as into the return channel and having such a thickness that the two components which must be relatively displaced are mutually interconnected only by means of such balls.

In a particular embodiment of the present invention the apparatus for focusing an optical system consists essentially of a guide cylinder and a coaxial tube guided inside or onto the cylinder and containing at least a portion of an optical system. The guide cylinder and the tube are relatively displaced by a rotational motion converted into a linear motion for the purpose of focusing.

For converting the rotational motion into a linear one, i.e. for producing a relative linear displacement between the guide cylinder and tube components (1,2) of the apparatus, a principle practiced with ball thread spindles is applied. To comply with this principle each component is provided with a guide groove (3,4) helically winding around the axis of rotation (5) of each component (1,2). One of the components (1,2) is provided with a return channel (6) connecting at least two consecutive turns of the guide groove (3). The segment of the guide groove (3,4) bounded by the two junctions (7,8) of the return channel (6) and the return channel (6) are filled with balls (9) having such a thickness that the two components (1,2) which must be displaced with respect to each other are interconnected only by means of the balls (9).

Other embodiments of the present invention include the return channel (6) mounted in the coaxial tube (2), the return channel (6) mounted in the guide cylinder (1), the return channel (6) having a shape approaching an arctan curve and or external return conduit (19) being provided as the ball return channel (6).

BRIEF DESCRIPTION OF THE DRAWING

The drawing shows schematic representations of the present invention in relation to illustrative embodiments, and further details concerning the present invention are provided below.

DESCRIPTION OF THE PREFERRED EMBODIMENTS

Figure 1:
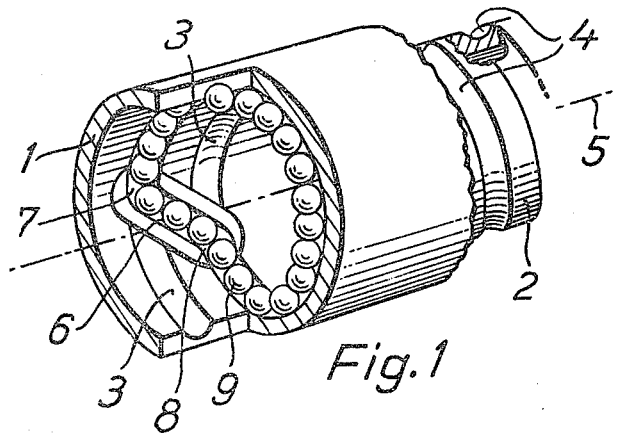
FIG. 1 is a perspective sectional view showing in elevation the guidance principle of a ball thread between two tubes.

With particular reference to FIG. 1, a guide cylinder 1 and a coaxial tube 2 are each provided with a guide groove 3,4 winding about a common axis of rotation 5. The guide cylinder 1 is provided with a return channel 6 which is deeper than the guide groove 3 and which connects two consecutive turns of this guide groove 3. The segment of the guide groove 3 bounded by the junction sites 7,8 of this return channel 6 as well as the return channel 6 itself are filled with balls 9 having such a diameter that the guide cylinder 1 and the tube 2 are interconnected only by means of these balls 9.

When there is relative rotation between the guide cylinder 1 and tube 2 the balls 9 are fed back from one turn of the guide groove 3 into the other. As the balls 9 are the only contact between the guide cylinder 1 and the tube 2, the friction between these is substantially eliminated. Therefore it is very easy to rotate the guide cylinder 1 with respect to the tube 2. Moreover the almost complete absence of friction ensures that there is no "stick-slip" effect. By "stick-slip" effect is meant no adhesion when setting into motion, and no irregular motion for slow linear displacements.

Figure 2:
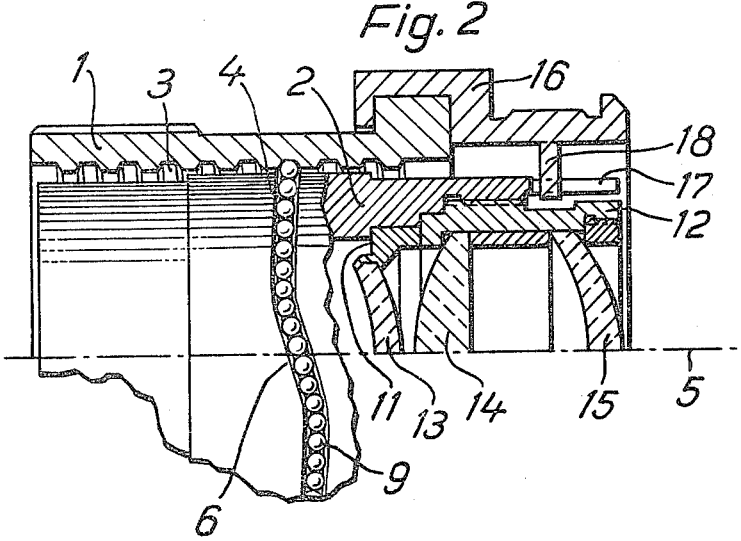
FIG. 2 is an embodiment of the device of the present invention with an internal return channel.

In the embodiment of FIG. 2, the guide cylinder 1 is the range setting ring or range adjustment ring of a photographic objective. This ring is supported so as to be fixed in the axial direction while being radially rotatable about an axis of rotation 5 in a coupling ring or stationary tubular mount member 16 which is adapted to be attached to a camera body. A winding trapezoidal guide groove 3 is cut into the inside wall of this range setting ring.

The imaging part of the objective, of which for the sake of clarity only the rear lens elements 13,14,15 held in mounts 11,12 are shown, is mounted in tube or lens barrel and lens barrel 2 is provided on its outer surface with a correspondingly winding and trapezoidal guide groove 4 together with a return channel 6. The distance or range setting ring 1 and the lens barrel 2 are connected by means of the balls filling the guide groove 3,4 and the return channel 6.

In order to guide the imaging optics rectilinearly, lens barrel 2 is provided with a slot 17 at its rear end which is engaged by a straight guidance block 18 that is integral with the coupling ring or stationary tubular mount member 16. When the range setting ring 1 is rotated, it forces an axial motion of the lens barrel 2.

Figure 3:
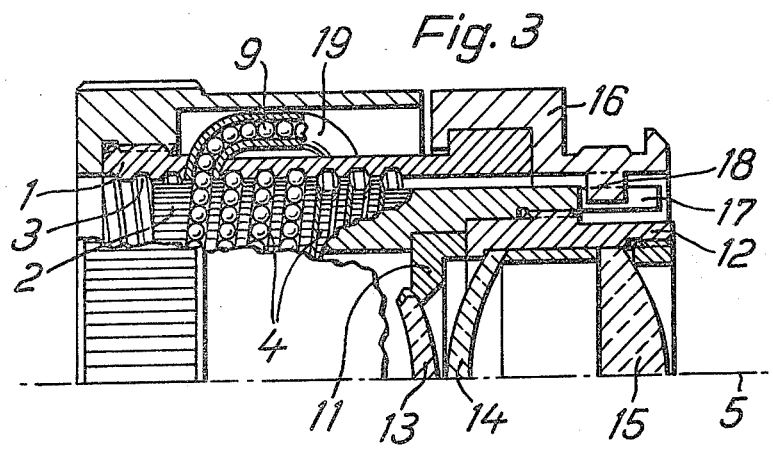
FIG. 3 is an embodiment of the device of the present invention with an external return channel.

The variation shown in FIG. 3 differs from the embodiment in FIG. 2 in that the return of the balls 9 is implemented by a return tube 19 mounted to the range setting ring 1. This tube 19 picks up the balls filling the guide grooves 3,4 at the ends of these grooves, guides them around the outside wall of the guide cylinder 1 (range setting ring) and once more feeds them into the beginning of these guide grooves 3,4.

The advantage of this embodiment is that the balls leave their path tangentially and are fed again at the matching side tangentially to their path. Because of the extremely slight drag to be overcome in such an embodiment, there results a still more impact free and more uniform course of the balls which is ensured both for high winding pitches and multiple threads and for single threads and commonplace pitches.

I claim:

1. In a lens mount for focusing a photographic objective having an optical axis, a stationary tubular mount adapted to be attached to a camera body, a focusing adjustment ring rotatably supported on said mount, a lens barrel including at least parts of said photographic objective and arranged coaxially inside said mount and means for mechanically interconnecting said focusing adjustment ring and said lens barrel for displacing said barrel in the direction of said optical axis upon rotation of said focusing adjustment ring, the improvement comprising:

said focusing adjustment ring (1) and said lens barrel (2) each having a guide groove (3, 4) helically winding around said optical axis (5), one of said focusing adjustment ring (1) and said lens barrel (2) having a return channel (6) connecting at least two consecutive turns of said guide groove (3) and said guide groove (4) bounded to a segment by the junctions (7, 8) of said return channel (6) and said return channel (6) being filled with a plurality of balls (9) having a given thickness for connecting said focusing adjustment ring (1) and said lens barrel (2) to be displaced with respect to each other only by means of said balls (9).

2. The lens mount of claim 1, wherein said return channel (6) is mounted on said focusing adjustment ring (1).

3. The lens mount of claim 2 wherein said return channel (6) has an arctan curve shape.

4. The lens mount of claim 1, further comprising an external returning conduit (1,9) provided as said ball return channel (6).

5. The lens mount of claim 1, wherein said return channel (6) is mounted on said lens barrel (2).

6. The lens mount of claim 5, wherein said return channel (6) has an arctan curve shape.

7. The lens mount of claim 1, wherein said guide groove (3, 4) is cut into an inner sidewall surface of said focusing adjustment ring and into an outer sidewall surface of said lens barrel.

* * * * *